3,460,491
GRATE IN A FLUIDIZED BED FURNACE
Petri Bryk and Jorma B. Honkasalo, Helsinki, Rolf Malmstrom and Olavi Aaltonen, Pori, and Matti Palperi, Kokkola, Finland, assignors to Outokumpu Oy, Helsinki, Finland, a corporation of Finland
Filed Jan. 3, 1967, Ser. No. 606,692
Int. Cl. F23l 5/04, 7/00; F26b 17/00
U.S. Cl. 110—69                              3 Claims

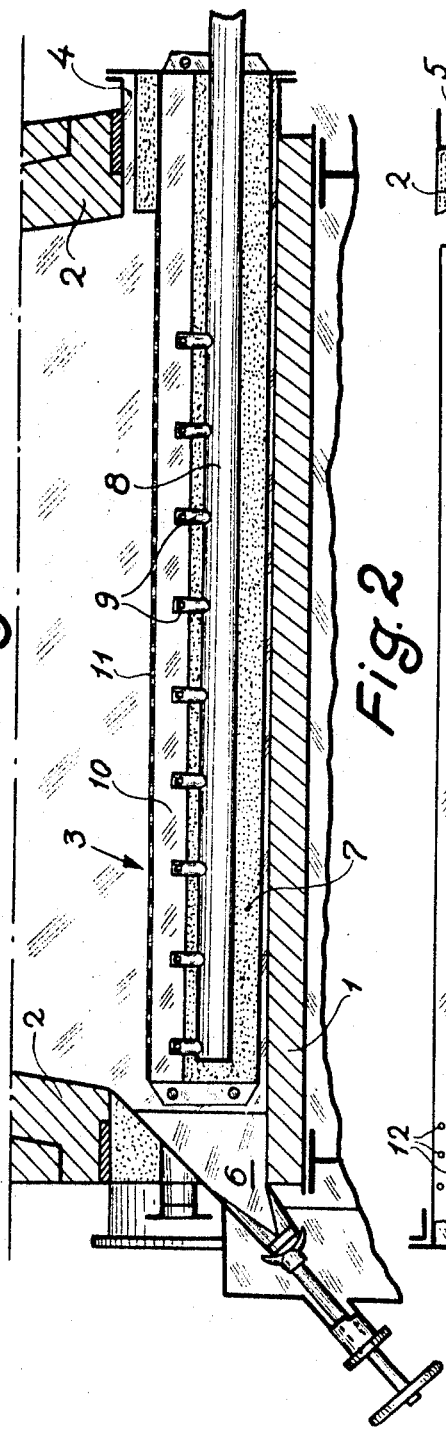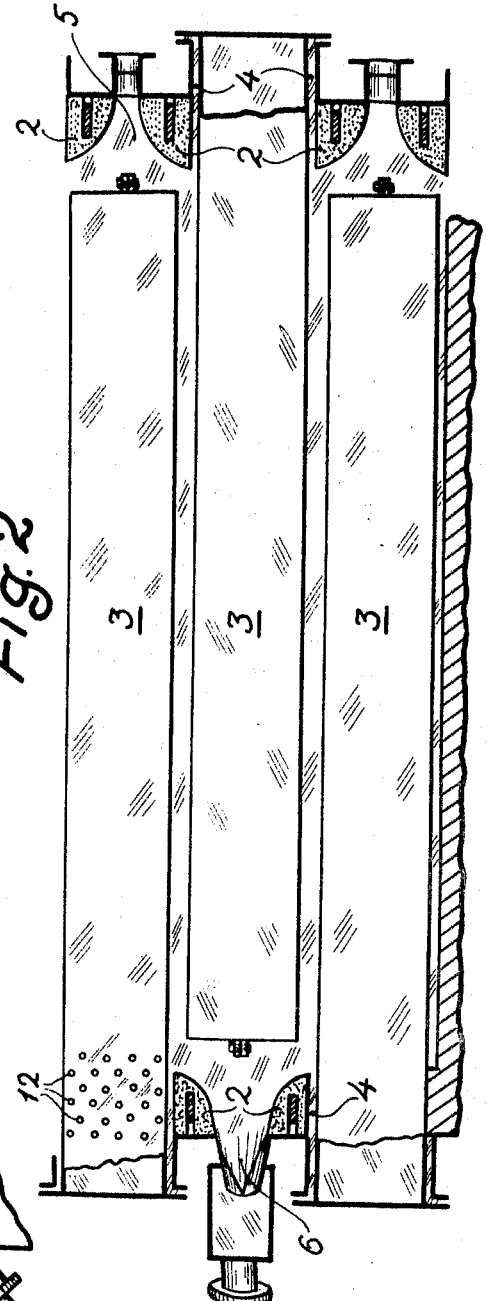

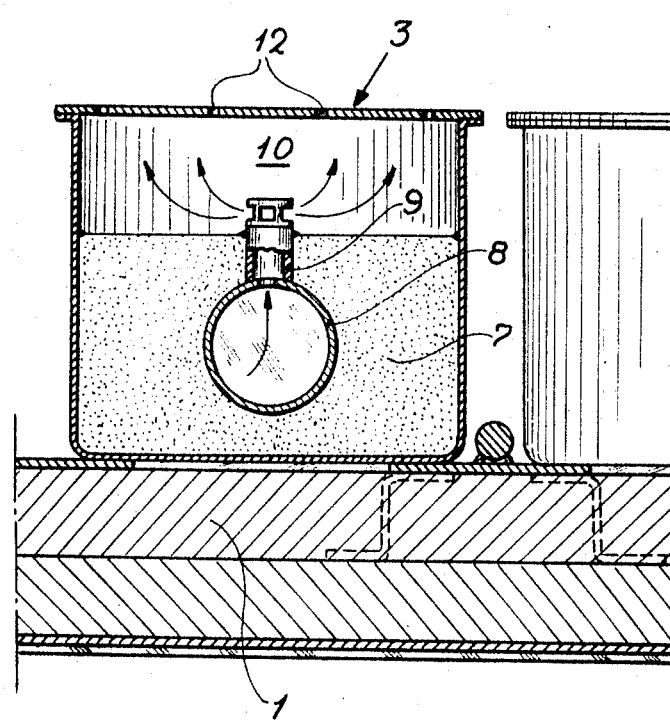

ABSTRACT OF THE DISCLOSURE

A grate made up of units in the form of long boxes with means formed in the furnace wall for the removable reception of the boxes. The top surfaces of the boxes form the grate and those surfaces are perforated to provide for the flow of air upward therethrough. Even distribution of air or gas within the boxes is provided for by means of a tube within each box having distribution holes therethrough spaced along the length thereof. The tube may be insulated to keep the temperature of the air passed through its constant. The upper or grate surface of each box may also be insulated with nozzles extending therethrough for distribution of the air or gas.

---

In a fluidized bed furnace, fluidization air or gas is introduced through the bottom of the furnace. For effective fluidization, the air or gas must be distributed as evenly as possible. This is achieved by producing a given pressure drop in the grate. The amount of the pressure drop depends on the process occurring in the reaction chamber in use, and on the prevalent conditions. In most cases, when the air or gas is fed in, it is first conducted into a large chamber, under the surface of said chamber that forms the grate, in such a way as to achieve an even pressure distribution under the grate. The pressure drop necessary for the process is then produced in the grate itself by modifying the air- or gas-flow area of the grate. The latter is made up, for instance, of rods that, when assembled, leave gaps suitable for the even distribution of air or gas, or else of other suitable openings in an otherwise covered surface.

To get at the grate, either the grate must be removed or the furnace must be allowed to cool to a temperature at which it can be entered for repairs and the like. If it is desired to remove the grate and if the furnace and thus the air distribution chamber are large, special means are required for removing the entire chamber, for instance, by lowering it from the furnace. In the case of a large furnace, this calls for relatively powerful machinery and also for a suitable amount of space under the furnace.

It has therefore been attempted to simplify the construction by making the grate units in the furnace smaller, but this has led to difficulties in rendering the structure air-tight, particularly between the grate units, which have to be as close as possible to each other to make the surface of the grate uniform. In large grate units, moreover, expansion and contraction of the grate caused by the spread of heat are difficult to control.

The object of the present invention is to eliminate these drawbacks.

A simple way of constructing a grate according to the invention is to make the grate units preferably in the form of long boxes, which can be thrust into the furnace chamber through its side or sides. Since the boxes are long and their length affects the even distribution of pressure under the grate, special attention must be paid to the air distribution. Just as the length of each box affects the distribution of the air or gas, so too does the rise of temperature caused by the heat transference occurring through the surface of the grate. For this reason, the pressure and temperature in the boxes under the grate must be kept as near constant as possible throughout each entire box. Otherwise, it is necessary to vary the areas of the holes in different parts of each box, depending on the temperature and pressure. This, of course, can be done for a single set of conditions in which no variation can be permitted.

To keep the temperature and pressure constant under the grate surface, according to one advantageous embodiment of the present invention, each box can be fitted with an inner tube that is well insulated and furnished with suitable air or gas distribution holes along the entire length of the box. This assures an even distribution of air or gas over the whole area of the grate and effective fluidization throughout the furnace.

In another advantageous embodiment of the invention, the grate surface is insulated from the box and the pressure drop in the grate surface is increased in such a way that it does not affect the air distribution in the grate at different parts of the box. This can be achieved by furnishing the upper surface of the box with an insulating layer— for instance ceramic—through which are conducted nozzles that distribute the gas or air evenly to the fluidized bed in the furnace.

The invention is described in greater detail below, with reference to the attached drawings, which show one embodiment of the invention.

FIG. 1 is a cross section through the grate area of a fluidized bed furnace with a grate according to the invention.

FIG. 2 shows the same grate as in FIG. 1, seen from above.

FIG. 3 is a cross section of a grate box on a larger scale.

Number 1 in the drawings is the bottom of the furnace 2 the side walls, and 3 the grate boxes, which are inserted into the bottom of the furnace through openings 4 provided alternately in opposite side walls 2. At the closed ends of the boxes, grate draft openings 5 are arranged along the bottom of one side wall 2, and along the bottom of the opposite side wall 2 are arranged furnace outlets 6.

Along the bottom of each grate box 3 there is an air inlet tube 8, surrounded by insulating material 7, such as mineral wool. Air nozzles 9 are arranged along the upper surface of said tube 8, so as to protrude above the mineral wool insulation 7 into the air chamber 10. The top 11 of the grate box 3 is furnished with holes 12 evenly distributed along its entire surface.

Bearing gas or air is conducted via the tube 8 and air nozzles 9 into the air chamber 10, from which it is distributed evenly over the whole surface of the grate from the holes 12.

Since the grate boxes 3 are fitted alternately into opposite sides of the furnace, it is easy to exchange them when required.

The invention is not restricted to the embodiment described above and shown in the drawings, but can be varied in many ways within the limits set by the claims. For example, if the furnace is shaped as a vertical cylinder, the grate boxes 3 can be made in the form of sectors of a circle. The cross section of the said boxes can also be other than rectangular in shape.

What we claim is:

1. A grate for a fluidized bed furnace comprising a plurality of elongated closed boxes formed for ready insertion into and withdrawal from said furnace, said boxes having upper walls forming grate elements, said grate elements being formed with perforations therethrough, and means for conducting gas into said boxes and distributing gas evenly throughout the area of said grate element comprising a tube extending throughout substantially the full length of said box and having a closed inner end, a chamber in said box between said tube and said grate element, and nozzles in the wall of said tube extending into said chamber.

2. A grate as in claim 1, including insulation means surrounding said tube, said nozzles extending up through said insulation means.

3. A grate as in claim 1, said grate elements being formed of ceramic material.

References Cited

UNITED STATES PATENTS

| | | | |
|---|---|---|---|
| 590,355 | 9/1897 | Apsey | 110—69 |
| 2,343,780 | 3/1944 | Lewis | 34—57 XR |
| 2,971,242 | 2/1961 | Doleman et al. | |
| 3,017,254 | 1/1962 | Evans et al. | |
| 3,361,539 | 1/1968 | Pyzel. | |

FREDERICK L. MATTESON, JR., Primary Examiner

H. B. RAMEY, Assistant Examiner

U.S. Cl. X.R.

34—57